United States Patent [19]

Miura

[11] 4,095,249

[45] June 13, 1978

[54] FILM CARTRIDGE EJECTING DEVICE FOR A CAMERA

[75] Inventor: Jiro Miura, Toyokawa, Japan

[73] Assignee: Minolta Camera Kabushiki Kaisha, Japan

[21] Appl. No.: 801,334

[22] Filed: May 27, 1977

[30] Foreign Application Priority Data

May 28, 1976  Japan .............................. 51-69511[U]

[51] Int. Cl.² .................... G03B 17/02; G03B 23/02
[52] U.S. Cl. ........................................ 354/288; 352/74
[58] Field of Search .................. 354/202, 288; 352/74

[56] References Cited

U.S. PATENT DOCUMENTS

| 2,153,220 | 4/1939 | Wittel ................................. 352/74 |
| 2,449,626 | 9/1948 | Suthann ............................. 352/74 |
| 3,543,664 | 12/1970 | Kremp et al. ..................... 354/288 |
| 3,672,279 | 6/1972 | Hackenberg et al. ............. 354/288 |

FOREIGN PATENT DOCUMENTS

494,589  10/1938  United Kingdom .................. 352/74

*Primary Examiner*—John Gonzales
*Attorney, Agent, or Firm*—Watson, Cole, Grindle & Watson

[57] ABSTRACT

An ejecting device for ejecting a film cartridge from a film cartridge chamber of a camera includes an elongated ejecting member which is pivotally mounted such that one end is positionable within the cartridge chamber through the floor thereof, and at the other end is operable to pivot the ejecting member upon the opening of the lid member of the cartridge chamber. The lid member is attached to one end of a double lever-type interlocking member, the other end of the interlocking member including a drive pin which is movable along an elongated slot in one side of the cartridge chamber. The drive pin is capable of operating the ejecting member, either through the intermediary of a drive member, or by contacting an integrally formed drive end of the ejecting member itself.

13 Claims, 6 Drawing Figures

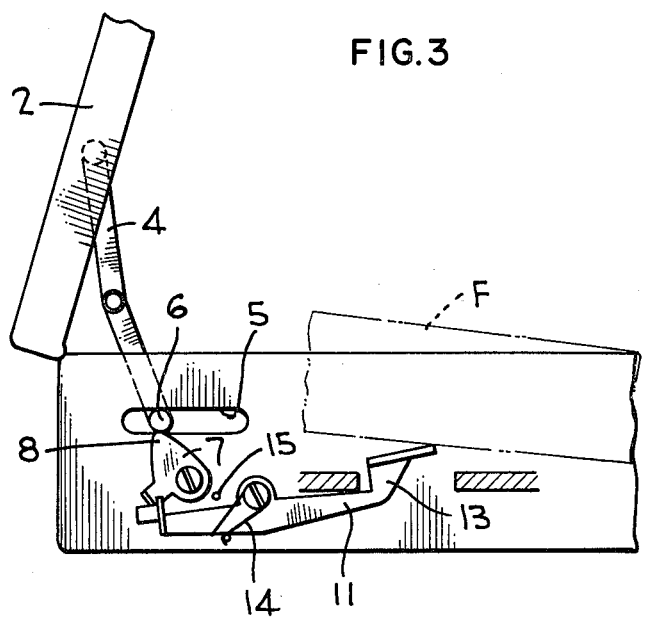
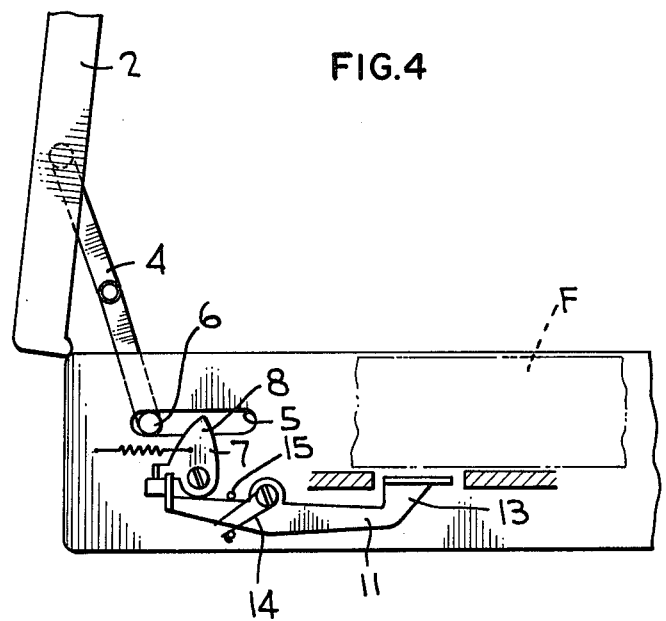

FILM CARTRIDGE EJECTING DEVICE FOR A CAMERA

BACKGROUND OF THE INVENTION

1. Field of the Invention

The present invention relates to a film cartridge unloading or ejecting device for a camera, and more particularly, to a device for facilitating the unloading or ejecting of a film cartridge from a cartridge chamber in a camera when the lid member of the camera is opened.

2. Description of the Prior Art

Film cartridge ejecting devices are known to the prior art, and a specific type is shown in FIG. 6. As shown therein, the ejecting member $a$ may move into and out of the cartridge chamber, and an operating member $b$ which is unitary with the lid portion of the camera is positioned to activate member $a$. More specifically, as the lid member is opened through a given angle, the operating portion $b$ will contact ejecting member $a$ and a portion of member $a$ will enter the cartridge chamber in order to force out film cartridge $f$.

This prior art device is not satisfactory since the lid operating portion $b$ and the ejecting member $a$ are constantly in contact with one another from a point when the lid is opened to a given angle until it is fully opened, and until the lid is again closed to an angle which is less than the given angle. Since the lid will normally have to be opened to a angle greater than the given angle in order to insert a film cartridge into the cartridge chamber, when the film cartridge is in fact inserted into the cartridge chamber, the ejecting member will be pushed back into its retracted position. This of course tends to force the lid to close and the ultimate result is that the photographer's finger is likely to get nipped between the lid and a wall of the cartridge chamber when the film cartridge is inserted. Thus, a quick exchange of film cartridges is impossible.

In addition, when the ejecting device is designed for enhancing the quickness of cartridge exchange such that the ejecting member will be moved during the initial phase of the lid opening procedure, a reduced spacing between the lid member and the top portion of the camera is produced at the point when the ejecting member is poised to project into the cartridge chamber. This results in the disadvantage that, when a film cartridge is positioned in the cartridge chamber, it remains very difficult to determine from outside the camera whether or not a film cartridge has been properly loaded. Thus, the cartridge can be improperly loaded, e.g., the film may be excessively paid out of the cartridge or the cartridge may be damaged when loaded, and the photographer would have no way of determining these conditions.

It is thus an object of the present invention to provide a cartridge ejecting device which will overcome these disadvantages in the prior art device.

It is also an object of the present invention to provide a film cartridge unloading or ejecting device for a camera which allows for the unloading or ejecting of the cartridge while its lid member is fully opened and for the loading of a new cartridge without the need for moving the lid member towards its closed position.

SUMMARY OF THE INVENTION

According to the present invention, a film cartridge unloading or ejecting device for a camera is constructed such that the lid member will operate the ejecting member to position its operating end in the cartridge chamber only after the lid member has been opened through a given angle, and such that when the lid member is fully opened, the lid member will no longer be in operative contact with the ejecting member. Accordingly, unlike the prior art device wherein the operations and positionings of the lid member and the ejecting member are interrelated over almost the entire range of the opening operation of the lid member, the present device is constructed such that the positioning of the ejecting member is not related to the position of the lid member when the lid member is fully opened. Thus, when the lid member is fully opened and a cartridge is loaded in the cartridge chamber, the lid member will not be moved by any contact between the lid member and the ejecting member. Instead, the film cartridge can be loaded into the camera cartridge chamber in an undisturbed, free fashion and the lid member will retain its fully opened positioning. As a result, exchanging of cartridges, and specifically the loading of a new cartridge, will not be hindered by the closing movement of the lid member. Quick exchange of one cartridge for another is facilitated.

As indicated, according to the device of the present invention, when the lid member is fully opened, the ejecting member is not maintained in contact with the lid member, and thus the ejecting member is not forced to maintain its operating end in the cartridge chamber. Even when the ejecting member is operable during the initial phase of opening the lid member, there is no need to maintain the lid member open at only a small angle when loading a new cartridge (as in the prior art device), but instead the lid member may be maintained in its fully opened position at all times. Accordingly, upon loading of a cartridge, the loaded condition of the cartridge may be easily confirmed from outside of the camera, e.g., when the lid member is fully open, such that the photographer can know when the cartridge has been improperly loaded. In this way, taking defective pictures due to defective loading of the film cartridge can be completely avoided.

According to one embodiment of the present invention, the ejecting member is formed separately of the drive member (which is positioned to drive the ejecting member) and the ejecting member is actuated by the lid member only when the lid member is opened. With the mechanism of this embodiment, the ejecting member is capable of returning to a positioning such that the operating end thereof is retracted outside of the cartridge chamber once the lid member is fully opened and the range of movement of the ejecting member is kept to a minimum such that only a small operational space is required for the ejecting member outside of the cartridge chamber. As a result, the camera as a whole is kept compact in size.

In one aspect of the present invention the ejecting member is spring loaded in order to be biased in its retracted position, such that the operating end is maintained outside of the cartridge chamber. This prevents clattering of the ejecting member when the cartridge chamber does not contain a film cartridge. As such, unwanted noise is prevented and additionally the possible loose attachment of the ejecting member is prevented during its service life.

According to another embodiment of the present invention, the ejecting member may be formed integrally with the drive member, such that the ejecting member is driven by the lid member directly. The result is that the time and efforts required to manufacture and assemble the ejecting device is remarkably reduced, thereby permitting the production thereof at a reduced cost.

The cartridge chamber of the camera, when equipped with an ejecting device according to the present invention, is advantageously provided with at least one pressing member for forcing a film cartridge loaded the rein towards the exposure plane within the cartridge chamber, i.e., in a direction perpendicular to the direction of projection of the operating end of the ejecting member into the cartridge chamber. The structure of each pressing member is such that once the film cartridge has been at least partially ejected from the cartridge chamber, it will be at least maintained in this state. As a result, the opening of the lid member and the unloading operation (or pick-up) of the film cartridge may be independently accomplished. The film cartridge may be removed with ease.

More specifically, each pressing member may comprise a spring plate having an inclined portion directed towards the lid member such that when a film cartridge is loaded into the cartridge chamber, the film cartridge will be urged towards the exposure plane, and when the film cartridge is to some extent pushed out towards the lid member by the ejecting means, the film cartridge will be pushed further out. As a result, an increased spacing for withdrawal of the film cartridge is provided, thereby providing for a reduced sizing needed for the camera.

Further objects, advantages and features of the invention will be apparent in the arrangement and construction of the constituent parts in detail as set forth in the following further discussion taken with the accompanying drawings.

DESCRIPTION OF THE DRAWINGS

In the drawings,

FIGS. 2 to 4 show schematic views of the operation of the ejecting device in the camera of FIG. 1, the ejecting member being shown in a distorted fashion for illustrative purposes as opposed to its actual configuration as shown in FIG. 1. More specifically, FIG. 2 shows in schematic representation the positioning of the parts of the ejecting device when the lid of the camera is closed; FIG. 3 shows in schematic representation the positioning of the parts of the ejecting device when the lid of the camera is partially opened; and FIG. 4 shows in schematic representation the positioning of the parts of the ejecting device when the lid of the camera is fully opened;

DESCRIPTION OF THE PREFERRED EMBODIMENTS

Figure 1:
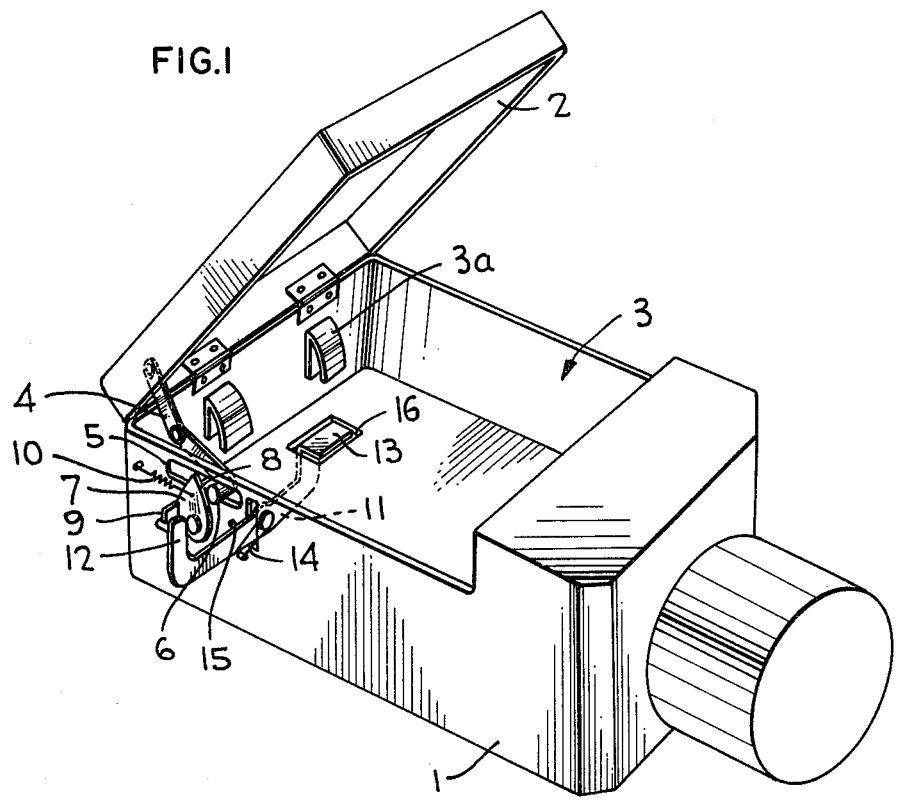
FIG. 1 shows in perspective a view of a camera which includes one embodiment of a film cartridge ejecting device according to the present invention.

Referring to FIG. 1, a camera body 1 is shown which has means therein forming a film cartridge chamber 3 into which can be loaded a film cartridge of the type, for example, used in a movie camera or a 110-size camera. A lid member 2 is mounted on hinges to allow for raising and lowering thereof and thus provide access to chamber 3 for inserting or withdrawing a film cartridge. Pressing plates 3a are positioned within chamber 3 so as to force a loaded film cartridge towards the exposure plane. An interlocking member 4 is connected at one end to the lid member 2 and is composed of two connected levers so as to form a double lever-type member which can pivot at (generally) its midway point. The opposite end of the member 4 is connected to a drive pin 6 which extends through and is movable along elongated slot 5 which is formed in one side wall of the film cartridge chamber 3.

Figure 2:
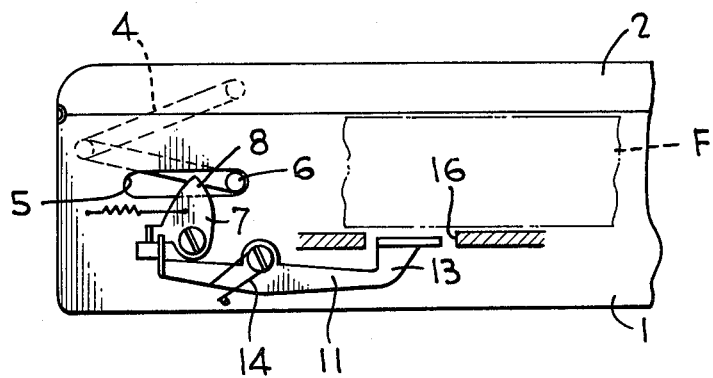

As indicated in FIGS. 2–3, the drive pin 6 is engageable with a drive member 7 which itself is connected to a stationary portion of the side wall of the chamber 3 and is pivotable about the connecting means therefor, and the drive member 7 is formed to include a cam portion 8 which is engageable by the drive pin 6. A spring 10, one end of which is connected to the drive member 7 and the other end of which is attached to the chamber 3, functions to bias drive member 7 in a counterclockwise direction at all times. Drive member 7 also includes an engaging projection 9 which is engageable with a projecting portion of an engaging end 12 of an ejecting member 11, ejecting member 11 being elongated and passing through a slot in the side wall of the camera body 1 and having an operating end 13 which is movable through a through-hole 16 in the floor means forming the bottom of the cartridge chamber 3. The ejecting member 11 is pivotally supported so as to be movable through a given angle, and it is contacted by a spring 14 so as to be biased in a clockwise direction. For proper operation of the invention, spring 14 must be stronger than spring 10 so that ejecting member 11 will maintain its stationary condition. A pin 15 is positioned in the locus of movement of the ejecting member 11 such that the pin will prevent the member from being rotated too far in a clockwise direction when freed to rotate. The operating end 13 of the ejecting member 11 extends towards through-hole 16 formed in the floor means of the chamber 3 such that, as noted previously, when ejecting member 11 is rotated in a counterclockwise direction, the operating end 13 will enter into cartridge chamber 3 through through-hole 16 in the chamber floor.

In order to replace a film cartridge located in cartridge chamber 3, lid member 2 is opened from its initially closed position as schematically indicated in FIG. 2. As lid member 2 is opened, drive pin 6 is caused to move along elongated slot 5 (to the left) by the relative movements of the two connected levers forming interlocking member 4. Drive pin 6 thus engages the cam portion 8 of drive member 7 when the lid member 2 is at least partially opened, and as the lid member 2 is opened further the pin 6 urges cam portion 8 to rotate drive member 7 in a counterclockwise direction (see FIG. 3). This counterclockwise rotation of drive member 8 causes ejecting member 11 to rotate in a counterclockwise direction against the action of spring 14, and thus operating member 13 is moved upwardly and into the cartridge chamber 3 through the through-hole 16. By this movement of operating member 13, the film cartridge (shown by F in FIG. 3) is contacted by the operating member and is forced out of the cartridge chamber. Once the film cartridge F is forced at least partially out of the chamber 3, it remains in this positioning due to the action of pressing plates 3a which project towards the exposure plane. In this way, the film cartridge can be removed with ease. Of course, if an external force is applied to the cartridge to overcome the action of pressing plates 3a, the cartridge will be returnable to its inserted positioning within the cartridge chamber 3.

As lid member 2 is further opened to its fullest extent (see FIG. 4), the drive pin 6 is caused to continue to move along elongated slot 5 (i.e. to the left as shown in FIG. 1) past its engagement with cam portion 8 such that ejecting member 11, which has been rotated in a counterclockwise direction by means of the drive member 7, will be released from its pressed condition. In this situation the spring 14 will cause the ejecting member 11 to rotate to its retracted position, i.e., in engagement with pin 15. As can be seen from FIG. 4, this situation will result in operating end 13 being retracted to a position below the bottom floor of cartridge chamber 3 such that the cartridge chamber 3 is again capable of accomodating a cartridge therein. At this point, a new cartridge can be loaded into the chamber 3 such that with the closing of lid member 2, the film cartridge exchange will be completed.

In this latter step of closing lid member 2, it should be noted that drive pin 6 will again move along elongated slot 5, this time to the right, and in the process it will engage cam portion 8 and rotate drive means 7 in a clockwise direction. However, this rotation of drive means 7 does not affect the positioning of ejecting member 11, i.e., the ejecting member 11 will not be caused to rotate such that operating member 13 will enter cartridge chamber 3; instead, ejecting member 11 will stay in its retracted position due to the action of spring 14. Since ejecting member 11 will stand still during the closing of lid member 2, there is no danger that the operating end 13 of the ejecting member 11 will contact the film cartridge and affect the positioning thereof.

As can be appreciated from the embodiment of the film cartridge ejecting device depicted in FIGS. 1-4, the ejecting member 11 is a separate member from the drive member 7, although the drive member 7 is positioned to drive the ejecting member 11 when the lid member 2 is opened. With this set-up, it is sufficient that the ejecting member be able to move between a position wherein drive pin 13 projects into cartridge chamber 3 and a position wherein drive pin 13 is retracted to a point just beneath the floor of the cartridge chamber 3. This set-up thus displays the advantage of allowing for a reduction in the size of the camera due to the fact that the space required for the operation of ejecting member 11 below the floor of the cartridge chamber 3 is kept to a minimum.

It should be also appreciated that in the situation wherein spring 14 is used for biasing the ejecting member 11 in its retracted position, clattering of the ejecting member 11 is prevented, e.g., even when the cartridge chamber 3 is unloaded, such that when the camera is carried, no unwanted noise is heard, i.e., due to a loose attachment of the ejecting member to the camera.

Furthermore, as suggested previously, the use of pressing plates 3a is quite advantageous because they are constructed and positioned to urge a film cartridge within cartridge chamber 3a towards the exposure plane and perpendicular to the direction of entrance of operating end 13 of ejecting member 11 as it enters into the cartridge chamber, and they also tend to prevent a film cartridge, once at least partially ejected from the cartridge chamber 3 by means of operating end 13 when the lid is fully opened, from returning to its loaded position. Thus, there is no need to manually pick up the cartridge during the course of opening lid member 2, but instead the cartridge can be manually removed after the lid-opening operation has been completed. In this way, unloading of the film cartridge from the camera is greatly facilitated.

Figure 5:
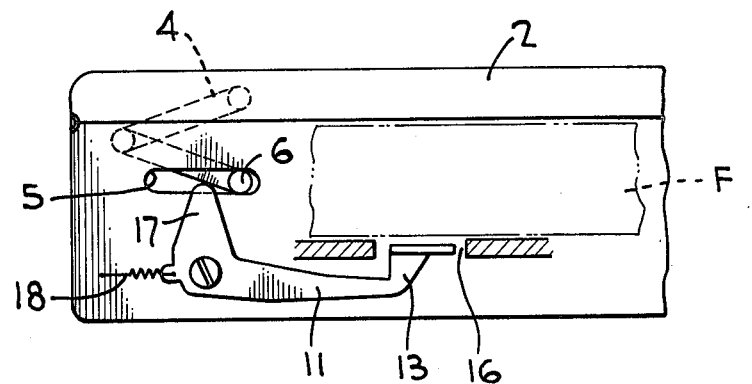
FIG. 5 shows in schematic view the essential parts of an alternative film cartridge ejecting device according to the present invention.
Figure 6:
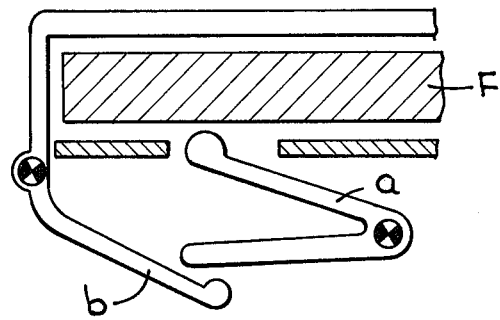
FIG. 6 shows an explanatory view of a prior art film cartridge-ejecting device.

In accordance with the present invention, it is not always required that the ejecting member be formed separately from the drive member. As shown in FIG. 5 (wherein like parts to the parts shown in FIGS. 1-4 are identified by like reference numerals), ejecting member 11 is in the form of an L-shaped lever which is pivoted to a stationary portion of the camera body. The lever is formed with a drive end 17 which serves as a cam and is positioned in the moving locus of drive pin 6. Thus, when lid member 2 is opened and drive pin 6 is moved along elongated slot 5 (to the left), lever (or ejecting member) 11 will be rotated in a counterclockwise direction and thus force cartridge F out of the cartridge chamber 3. On the other hand, when the lid member 2 is moved to its closed position, ejecting member or lever 11 will be rotated in a clockwise direction (from the position shown) and thus will not hinder the positioning of a loaded cartridge. A spring 18 is connected to lever 11 in order to maintain the lever in the balanced position as shown in FIG. 5, and when lever 11 is rotated in a counterclockwise direction, spring 18 acts to eventually rotate the lever back in a clockwise direction. Conversely, when the lever 11 is rotated in a clockwise direction by the action of drive pin 6, the spring 18 biases ejecting member 11 to rotate back in a counterclockwise direction. This produces a so-called snap action.

The FIG. 5 embodiment of the invention has the disadvantage when compared to the FIGS. 1-4 embodiment of the invention of requiring a larger space below the floor of the cartridge chamber 3 for movement of the lever 11 due to its movement from the retracted position (as illustrated in FIG. 5) to a further retracted position when the lid 2 is closed; however, it offers the advantage of one piece construction for the ejecting member and the drive member which results in manufacturing savings in time and money for the ejecting device as a whole. Thus, it can be produced at a low cost.

While there has been shown and described what is considered to be the preferred embodiments of the present invention, it should be obvious to those skilled in the art that various changes and modifications could be made therein without departing from the invention as defined in the appended claims.

We claim:
1. A film cartridge ejecting device for use in a camera comprising:
   means forming a cartridge chamber for receiving a film cartridge therein including side walls and a floor;
   a movable lid member connected to one of said side walls for providing access to said cartridge chamber;
   an ejecting means which is movable to a first position wherein said ejecting means projects into said cartridge chamber and a second position wherein said ejecting means is retracted out of said cartridge chamber;
   a drive means for moving said ejecting means from said second position to said first position; and an operating means movable in opposite directions with respect to the respective opening and closing of said lid member, said operating means being positioned to contact and operate said drive means when said lid member is partly opened, but which is positioned out of contact with said drive means when said lid member is fully opened, and which contacts but does not operate said drive means when said lid member is closed.

2. The film cartridge ejecting device as set forth in claim 1, wherein said drive means comprises a drive member which includes a cam portion which is positioned to be contactable by said operating means such that when said operating means moves in one direction due to the opening of the lid member, the drive member is caused to rotate in one direction, and when said operating means moves in the opposite direction due to the closing of the lid member, the drive member is caused to rotate in the opposite direction.

3. The film cartridge ejecting device as set forth in claim 2, wherein said operating means comprises a drive pin, wherein said drive pin is connected to said lid member by means of a double lever interlocking member, and wherein a guide slot is provided in one of said side walls of said cartridge chamber adjacent to said side wall to which said lid member is connected, said drive pin being positioned to move along said guide slot in opposite directions depending on whether said lid member is being opened or closed.

4. The film cartridge ejecting device as set forth in claim 3, wherein said cam portion of said drive means is positioned along the locus of movement of said drive pin in said guide slot.

5. The film cartridge ejecting device as set forth in claim 4, wherein said cam portion of said drive means is positioned adjacent to said guide slot at a predetermined point thereof such that as said drive pin moves along said guide slot in either direction, it contacts said cam portion so as to rotate said drive means, and as it continues along said guide slot it becomes disengaged from said cam portion.

6. The film cartridge ejecting device as set forth in claim 5, wherein said ejecting means and said drive means are separately-formed structures.

7. The film cartridge ejecting device as set forth in claim 6, wherein said drive means includes an engaging projection which is engagable with said ejecting means to move said ejecting means when said drive pin is moved along said guide slot in response to the opening of said lid member.

8. The film cartridge ejecting device as set forth in claim 7, wherein a spring is connected to said drive means to bias said drive means so as to return said cam portion thereof to its positioning at said predetermined point adjacent said guide slot after said drive means has been rotated in response to the movement of said drive pin during the closing of said lid member.

9. The film cartridge ejecting device as set forth in claim 5, wherein said drive means and said ejecting means are integrally-formed structures.

10. The film cartridge ejecting device as set forth in claim 9, wherein a spring is attached to said ejecting means to bias said ejecting means to said second position thereof.

11. The film cartridge ejecting device as set forth in claim 10, wherein said ejecting means comprises an elongated ejecting member which includes an operating end portion, wherein said floor of said cartridge chamber includes a hole therein, and wherein said operating end portion of said ejecting member is movable to said first position within said cartridge chamber through said hole.

12. The film cartridge ejecting device as set forth in claim 1, wherein a pressing member is attached to said side wall of said cartridge chamber to which said lid member is attached, said pressing member being capable of biasing a film cartridge placed in said cartridge chamber in a direction substantially perpendicular to the direction of projection of said ejecting means into said cartridge chamber and being capable of projecting further into the chamber so as to prevent the cartridge from being reloaded into the chamber by the weight of itself after the cartridge has been once ejected therefrom.

13. The film cartridge ejecting device as set forth in claim 12, wherein said pressing member comprises a plate spring, the structure of said plate spring acting to press a film cartridge loaded into said cartridge chamber toward an exposure plane and to push the cartridge further out of said cartridge chamber after the cartridge has been at least partially ejected therefrom by said ejecting means.

* * * * *